United States Patent [19]

Dick

[11] 4,227,712
[45] Oct. 14, 1980

[54] PEDAL DRIVEN VEHICLE

[76] Inventor: Timber Dick, P.O. Box 611, Burlingame, Calif. 94010

[21] Appl. No.: 11,782

[22] Filed: Feb. 14, 1979

[51] Int. Cl.$^3$ .................. B62M 15/00; B62M 1/04; B62M 1/06
[52] U.S. Cl. .................. 280/236; 280/255; 280/258
[58] Field of Search .......... 280/236, 252, 253, 255, 280/258; 74/217 B

[56] References Cited

U.S. PATENT DOCUMENTS

| | | | |
|---|---|---|---|
| 3,661,404 | 5/1972 | Bossaer | 280/255 |
| 3,820,820 | 6/1974 | Kutz | 280/252 |
| 3,891,235 | 6/1975 | Shelly | 280/252 |

FOREIGN PATENT DOCUMENTS

| | | | |
|---|---|---|---|
| 92777 | 7/1897 | Fed. Rep. of Germany | 280/236 |
| 650892 | 2/1929 | France | 280/236 |
| 200385 | 7/1923 | United Kingdom | 280/236 |

*Primary Examiner*—John J. Love
*Assistant Examiner*—Donn McGiehan
*Attorney, Agent, or Firm*—Hume, Clement, Brinks, Willian & Olds, Ltd.

[57] ABSTRACT

A pedal driven vehicle such as a bicycle which employs oscillating levers instead of crank type pedals, and endless chain to which the two pedal levers are respectively connected, one to each run of the chain by pull and push rods to impart an oscillatory movement to said chain and in which the oscillating chain is connected to drive two shafts in opposite directions at any one time and means including one way drives connecting said shafts respectively to the drive wheel for propelling said vehicle. The vehicle also has means for simultaneously moving the connections between said pull and push rods and the oscillating levers respectively along the lengths of said levers in the same direction so as to change the effective leverage of said levers and to thus change the driving ratio imparted to the propelling wheel by the drive mechanism.

4 Claims, 6 Drawing Figures

PEDAL DRIVEN VEHICLE

BACKGROUND OF THE INVENTION

This invention relates to vehicles which are pedal driven and particularly to novel and improved pedal driven vehicles such as bicycles, tricycles, velocipedes, boats, catamarans, and like vehicles.

This invention is particularly useful as applied to bicycles. In addition to being embodied in an entirely new bicycle it may be constructed by employing the frame, seat and wheels of a conventional bicycle and a kit of parts constituting the novel driving mechanism of this invention. The driving mechanism can be readily applied to the conventional bicycle frame to produce a highly improved bicycle having greatly increased pedalling efficiency as compared to that of a conventional bicycle.

Numerous pedal drives for bicycles and like vehicles have been developed in the past and are shown in prior art literature and many of these relate to efforts to eliminate the relative inefficiency inherent in the circular path of movement common to the conventional pedal cranks employed for turning associated drive sprockets. Improvement in this respect is desirable for two reasons, the first of which is to provide paths of movement for the pedals which approximate more closely a straight line movement which is better adapted to the strongest and longest leg thrust of the pedalling rider and the second of which is to provide a drive mechanism which in and of itself has a high mechanical advantage in its action of converting the leg motion of the rider into the rotary motion of the driven wheel which propels the vehicle.

SUMMARY OF THE INVENTION

It is an object of this invention to provide a vehicle of the type referred to which realizes both of these advantages to a high degree and which at the same time permits, when toe clips are used, the lifting movement of one leg to exert a driving force to the system by adding the lifting force of one leg to the downward thrust force of the other leg.

It is a further object of this invention to provide an improved vehicle of the type described which also is capable of altering the driving ratio so as to permit a slower propulsion for going up hills and a faster propulsion when the terrain over which the vehicle is being propelled permits, and to accomplish such change in driving ratio not by a step by step shift characteristic of gear and sprocket drives now in general use, but by a gradual and continuous smooth change as commanded by the rider of the vehicle when the bicycle is in motion.

It is a further object of this invention to provide a vehicle such as a bicycle which has such efficiency that it is capable of pedal propelled speeds on level ground at significantly greater rates than that which now can be realized with conventional bicycles.

BRIEF DESCRIPTION OF THE DRAWINGS

The accompanying drawings illustrate one form of this invention which is given by way of example.

DESCRIPTION OF THE PREFERRED EMBODIMENT

Figure 1:
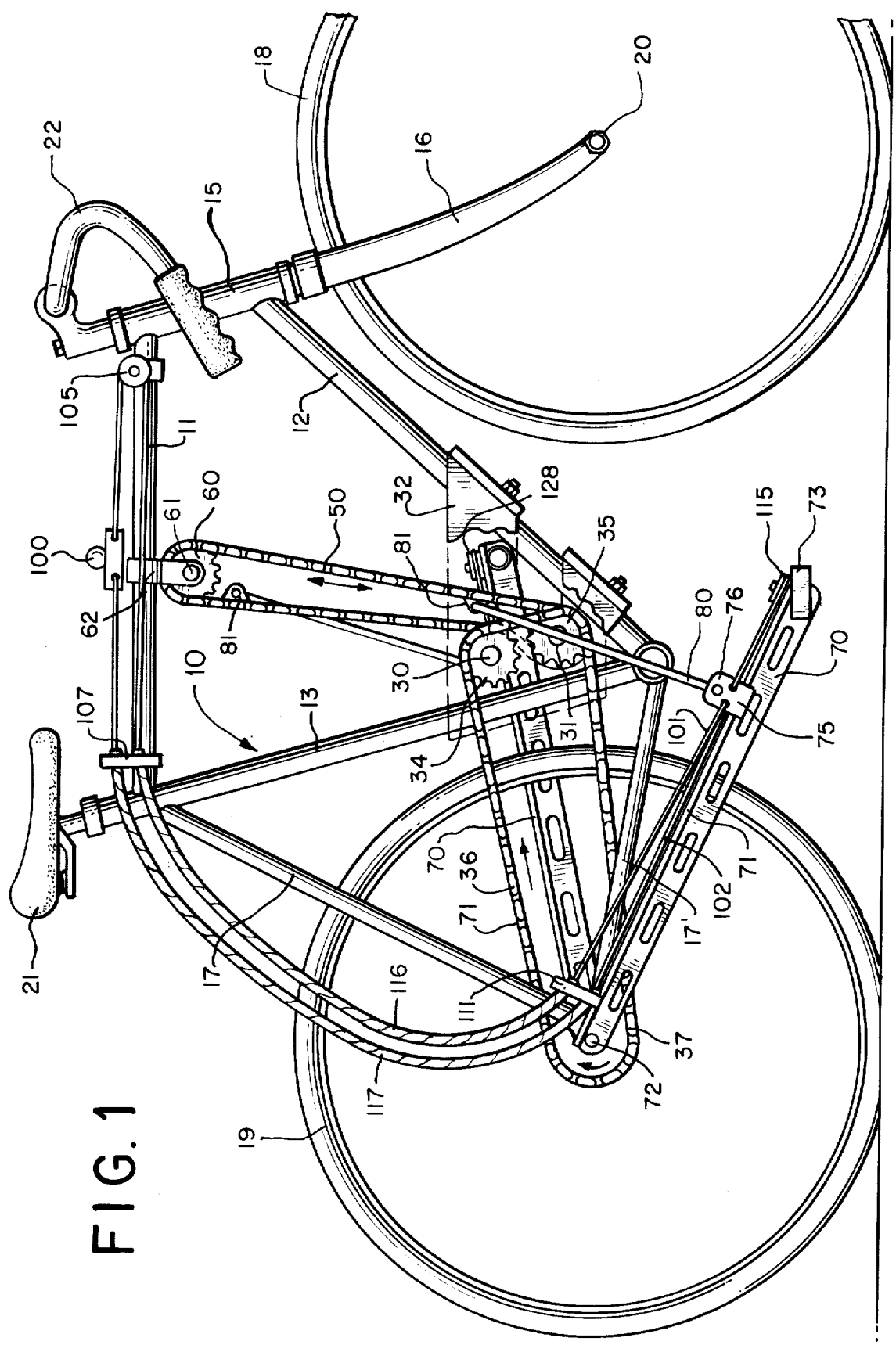
FIG. 1 of the drawing is a side elevational view of a bicycle constructed in accordance with this invention.

The invention may be better understood by referring to the accompanying drawings as the following description proceeds. It will be observed from FIG. 1 that the bicycle here illustrated comprises a frame 10 of conventional construction having main frame parts 11, 12 and 13 and a front bearing member 15 for accommodating the oscillating steering movement for the front ground wheel yoke 16. Other frame parts 17 and 17' constitute a rear wheel yoke which serves as a mounting for the rear wheel bearing 72 for rotatably supporting a rear ground wheel 19. The front wheel 18 is mounted for rotation by means of the bearing 20 supported by the front yoke 16. In addition the bicycle is provided a seat 21 of any desired construction and handle bars 22 which can be gripped by the rider for support and steering in the conventional manner.

The bicycle frame, seat, and handle bars thus far described are the same in all essential aspects as those corresponding parts on bicycles now in general use and in fact it is contemplated that this invention, where desired, may be applied to existing bicycles by merely removing the gearing existing on such bicycles and applying the novel gearing and the driving pedals of this invention. On the other hand the bicycle of this invention also may be supplied complete as a new vehicle.

Figure 3:
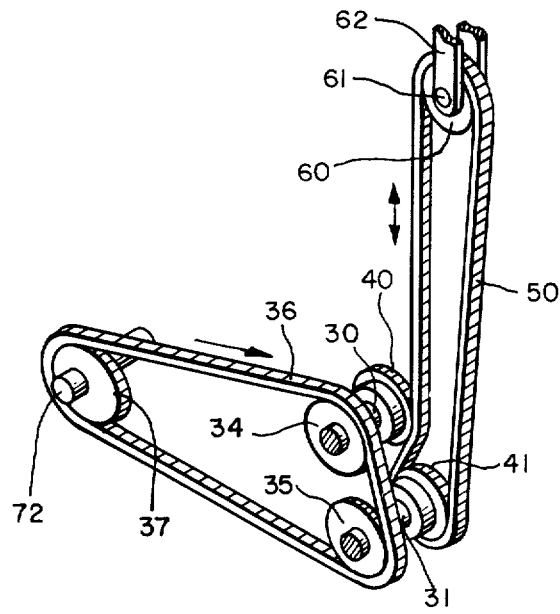
FIG. 3 is a perspective view of the gearing mechanism employed in the form of the invention illustrated in FIG. 1.

As illustrated in FIGS. 1 and 3 the gearing mechanism comprises a pair of parallel shafts 30 and 31 mounted one above the other in suitable bearings in a bracket member 32 effectively attached to and carried by the lower part of the bicycle frame. The upper shaft 30 is provided with a sprocket 34 and lower shaft 31 is provided with a sprocket 35 which sprockets are mounted in substantially the same vertical plane so as to accommodate and jointly drive a sprocket chain 36 which also passes in driving relation with sprocket 37 mounted on the rear ground wheel shaft 72. Thus it will be seen that as the sprockets 34 and 35 are rotated in clockwise direction as shown in FIGS. 1 and 3, the sprocket chain 36 will in turn rotate the sprocket 37 and the rear ground wheel in a clockwise direction and thus propel the bicycle forwardly over the ground.

In addition and as more clearly shown in FIG. 3, shafts 30 and 31 are also provided at their opposite ends with sprockets 40 and 41 each located on its respective shaft so as to cause the sprockets to be disposed in the same vertical plane and in positive relative to each other to engage a sprocket chain 50. As shown in FIG. 3 sprocket chain 50 engages the upper sprocket 40 tangentially by outside contact and the lower sprocket 41 by inside contact embracing the same in the lower bight of the chain as clearly illustrated. This driving arrangement results in the two sprockets 40 and 41 at any moment during the movement of the sprocket chain 50 to rotate in opposite directions.

Each of the sprockets 40 and 41 are connected to its respective shaft by a one way clutch drive such as a ratchet or the like hereinafter more fully described so that each will drive its respective shaft when it moves in a clockwise direction as shown in FIGS. 1 and 3, or in other words in a direction to propel the bicycle forwardly but will be free to turn with respect to their respective shafts when the sprockets are moved in the opposite direction.

Sprocket chain 50 in turn passes upwardly and over a pully member 60 mounted for oscillatory movement on a suitable pivot 61 held by a bracket 62 suitably clamped to and held by the upper bar 11 of the frame 10.

From this description it will be understood that when the chain 50 is caused to have its opposite flights reciprocated up and down that the sprockets 40 and 41 will be caused to oscillate but in opposite directions at any one instant and that the oscillating sprockets 40 and 41 will in turn cause a clockwise rotation of the shafts 30 and 31 by virtue of the action of the one way clutch drives connecting respectively of the sprockets 40 and 41 each to its associated shaft. It will also be seen that when sprocket 40 is propelling the bicycle forward, sprocket 41 is idling in a reverse direction and vice versa with the result that the reciprocating sprocket chain 50 produces a forward driving thrust on the rear ground wheel of the bicycle in both directions of the reciprocation.

In addition to the foregoing and as shown in FIG. 1 it will be noted that the bicycle is equipped with two pedal levers 70 and 70 one on each side of the bicycle and each mounted for oscillating movement on pivot 72. As illustrated the pivot is preferably located at the axis of the rear ground driving wheel. Each pedal lever is constructed to have a foot engaging part 73 pivoted at the end of the pedal lever and a slide track 71 for accommodating a slideable bracket 75 which in turn is provided with a portion for accommodating a pivot 76 for pivotally connecting the bracket 75 to a push and pull rod 80. The push and pull rod 80 on one side of the bicycle is connected to one flight of the reciprocating sprocket chain 50 by means of a bracket 81 whereas the push and pull rod 80 on the opposite side of the bicycle is connected to the other flight of the oscillating sprocket chain 50 by means of a similar bracket 81. The brackets 81 on the opposite flights of the sprocket chain 50 are attached respectively to pins of the sprocket chain 50 which are so desposed relative to each other that when one pedal lever is in its maximum lower position, the opposite pedal lever is in its maximum upper position and vice versa. Also it will be noted that the oscillating sprocket chain 50 effectively connects the two pedal levers so that the movement of one causes an equal and opposite movement of the other and thus the upward pull, by the use of the toe clips, of the rider by the upward movement of his leg assists and augments the downward thrust by the rider applied to his other leg.

Figure 2:
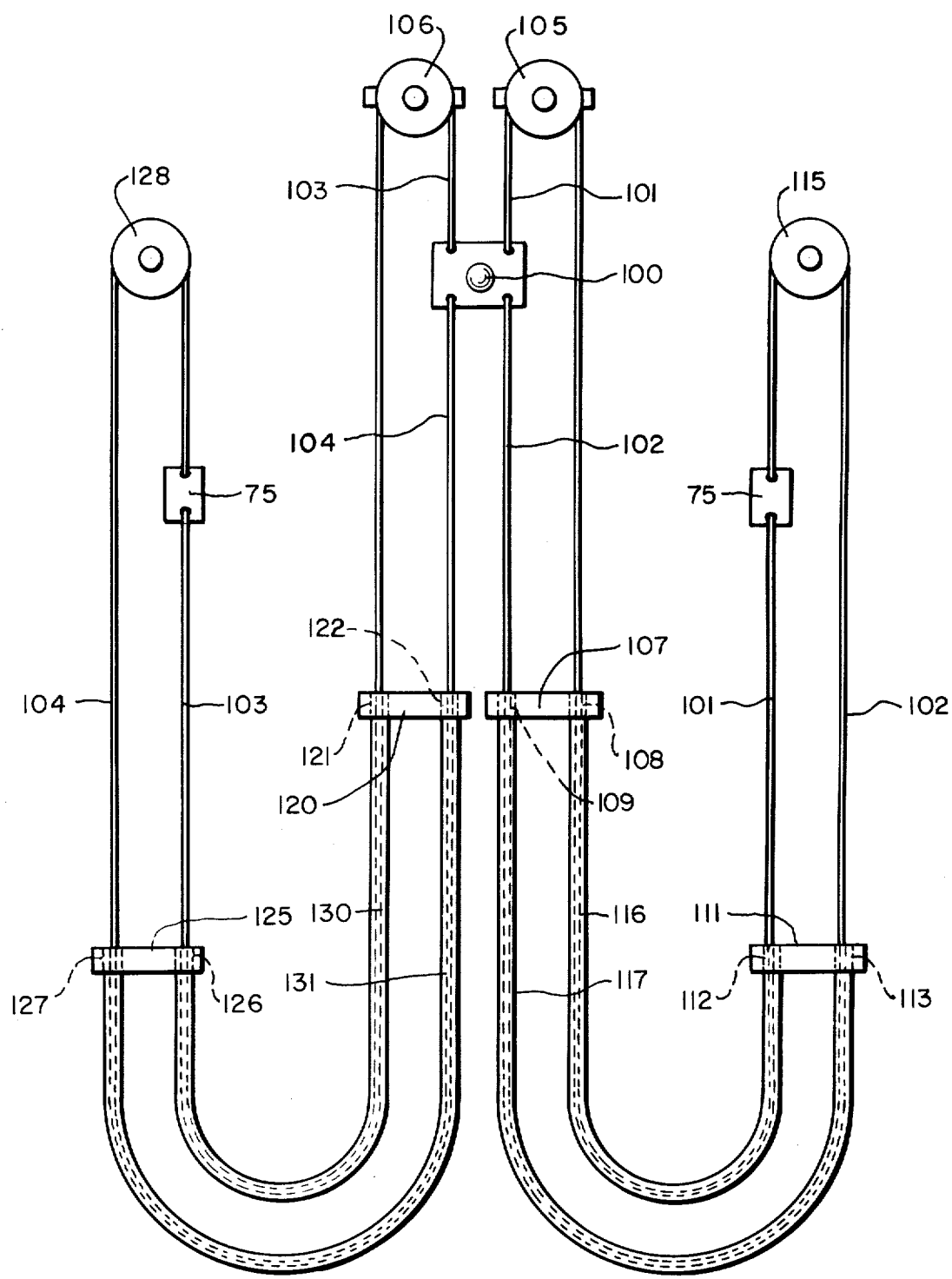
FIG. 2 is a diagrammatic representation of the cables and associated means for shifting the drive ratio.

Referring now to FIGS. 1 and 2 it will be seen that slidable brackets 75 on the two pedal levers 70 and 70 are mounted to slide forwardly toward the foot engaging part 73 and in the reverse direction toward the pivot 72 of each associated pedal lever. Such movement is under the control of the rider who can manually grip the operating handle 100 attached to cable 101 and 103 which extend forwardly of the handle 100 and cables 102 and 104 which extend rearwardly of the handle.

Mounted on the bicycle frame by suitable brackets are two cable pulleys 105 and 106. Cable 101 which is shown as the cable on the right side of the bicycle extends from the point of attachment to the handle 100 forwardly and over pulley 105 and then rearwardly to a bracket 107 having two cable passages 108 and 109 therethrough. Cable 101 passes through passage 108 and then down to a point adjacent the pivoted end 72 of the pedal lever 70 on the right hand side of the bicycle. At this point, a bracket 111 having two cable passages 112 and 113 therethrough is fixedly mounted on the right hand pedal lever 70. Cable 101 next passes through passage 112 and extends forwardly along the pedal lever 70 and is attached to the slideable bracket 75. Cable 102 which is also attached to operating handle 100 extends rearwardly from the operating handle and through passage 109 in bracket 107 and thence downwardly to bracket 111 on the pedal lever 70. At this point it passes through passage 113 in the bracket 111 forwardly and over the pulley 115 mounted on the forward end of the pedal lever 70 and thence rearwardly to the slideable bracket 75 to which it is attached. The portions of cables 101 and 102 which extend between the brackets 107 and 111 preferably are incased within flexible tubings 116 and 117 respectively attached at their ends to the two brackets 107 and 111 as shown in FIG. 3. From this arrangement it will be seen that when operating handle 100 is pulled rearwardly by the rider the slideable bracket 75 on the right side of the bicycle will likewise move rearwardly and by virtue of being so moved the leverage exerted by the pedal lever 70 is correspondingly altered.

A duplicate arrangement of cables 103 and 104 are provided for the left side of the bicycle as shown in FIG. 3 also attached to the operating handle 100. Cable 103 passes over forward pulley 106 thence rearwardly to bracket 120 which has passages 121 and 122 extending therethrough. Cable 103 then passes through passage 121 in bracket 120 and through tubing 130 to bracket 125 where it passes through passage 126 forwardly and is attached to the slideable bracket 75 on the left pedal lever. Cable 104 is attached to the operating handle 100 as shown in FIG. 2 and passes therefrom rearwardly through passage 122 in bracket 120 through the flexible tubing 131 passage 127 in bracket 125 and thence forwardly over pulley 128 and finally rearwardly to its point of attachment to the slideable bracket 75 on the left pedal lever 71.

In as much as the cable systems for both the right and left sides of the bicycle are attached to and are operated by the handle 100 and further that both the right and left system are arranged so that the pedal lever brackets on both sides move the same distance in the same direction at the same time it is apparent that the effective lever arm of the pedal levers respectively for transmitting movement to the reciprocating chain runs will be simultaneously altered both as to direction and degree of movement for any adjusting movement of the operating handle 100. Consequently, the ratio of the drive power as applied to the rotation of the driving ground wheel can be altered at will by the rider by merely moving the operating handle 100 forwardly or rearwardly as desired when the bicycle is in motion and is being propelled.

It will also appear that the drive ratio is altered by a smooth and infinitely variable shifting action rather than by a step by step change characteristic of many conventional bicycles employing a plurality of sprockets and a shiftable chain in association therewith.

Figure 4:
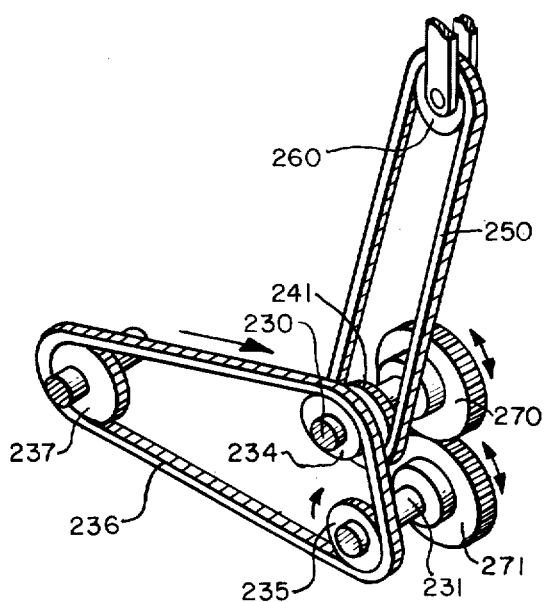
FIG. 4 is a perspective view of a modified form of the gearing mechanism for producing the same driving action as that produced by the gearing illustrated in FIG. 3, and FIGS. 5 and 6 are front and end elevational views respectively of a one way clutch drive that may be used with this invention.

In FIG. 4 there is shown a modified type of gearing mechanism which achieves the same result as that illustrated in FIG. 3. This form of drive comprises two shafts 230 and 231 disposed one above the other in a manner similar to the two shafts 30 and 31 shown in FIG. 3. A reciprocating endless chain 250 is also provided and is mounted over sprocket 241 and pulley 260 mounted on the frame of the bicycle. Sprocket 241 is mounted to oscillate on an axis which is coaxial with shaft 230. Fixedly connected to oscillate with sprocket 241 is a spur gear 270 which meshes in a one-to-one ratio with spur gear 271 mounted to oscillate on an axis which is coaxial with the axis of shaft 231. In addition to the foregoing there is a sprocket 234 connected to be driven by shaft 230 by a one way clutch drive such as that shown in FIGS. 5 and 6 and a sprocket 235 connected to be driven by shaft 231 by a similar one way clutch. These one way clutch drives are so constructed that shaft 230 drives sprocket 234 in a direction to cause the sprocket chain 236 to drive sprocket 237 and its attached wheel in the direction to propel the vehicle forwardly and the shaft 231 drives sprocket 235 in a direction to produce the same forward motion of the vehicle.

Inasmuch as sprocket 241 and spur gear 270 are connected to move as a unit it will be apparent that as the endless chain 250 reciprocates, spur gears 270 and 271 will oscillate at the same time but in directions opposite at any one time and that the sprockets 234 and 235 will be alternately propelled by the one way clutches, to jointly drive the vehicle forwardly.

Figure 5:
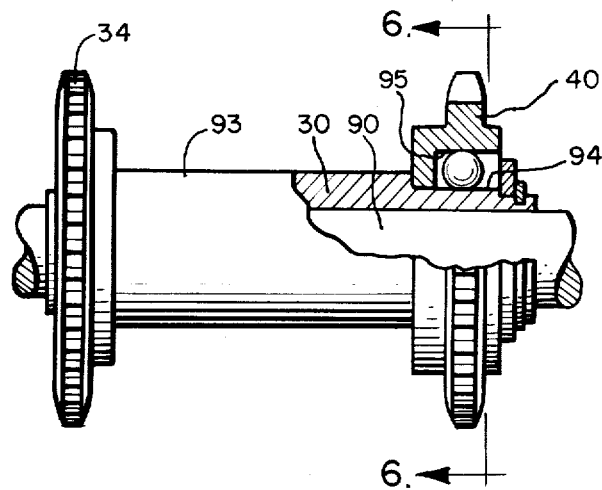
Figure 6:
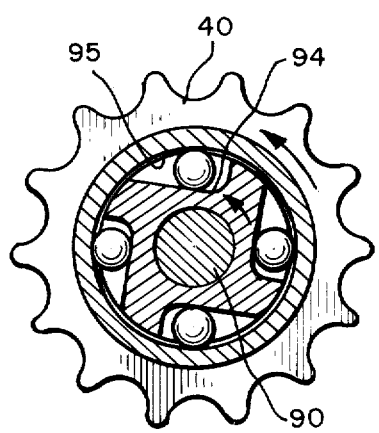

Referring now to FIGS. 5 and 6 it will be noted that a suitable one way clutch drive as required for this invention may comprise a central shaft 90 on which sprocket 40 is mounted for oscillation. Mounted on this same shaft is sprocket 34. These two sprockets have interfitting hubs related in the manner shown in FIGS. 5 and 6. Hub 93 is provided with a plurality of cam surfaces 94 and the hub 92 is provided with an inside cylindrical surface 95. Between surfaces 94 and 95 balls are provided and located in a manner to cooperate with the surfaces 94 and 95 to cause sprocket 40 to drive the hub 93 and sprocket 34 in a counter-clockwise direction as shown by the arrows in FIG. 6 when sprocket 40 turns in a counter-clockwise direction.

It will be understood also that one way clutches of this or a similar type are to be employed for connecting sprocket 41 to sprocket 35 in the construction shown in FIG. 3 and for connecting sprocket 241 to sprocket 234 and spur gear 271 to sprocket 235 in the construction shown in FIG. 4.

I claim:

1. A pedal driven vehicle such as a bicycle or the like comprising a frame, propelling means mounted in said frame, a pair of oscillating pedal levers, an endless chain and two pull and push rods connected respectively one to each of said oscillating pedal levers and respectively one to each run of said endless chain so as to impart oscillatory movement to said endless chain by the movement of said pedal levers, two parallel shafts, gearing associated with each of said shafts connected to oscillate with said endless chain, sprockets associated with each of said shafts and connected to drive said propelling means, and a one way clutch associated with one of said shafts and a second one way clutch associated with the other of said shafts said clutches each being constructed to alternately drive said sprockets in the same direction in response to the oscillatory movement of said gearing.

2. The vehicle defined in claim 1 further characterized in that said vehicle also has means for simultaneously moving the point of connection between each of said pull and push rods and its associated pedal lever along the length of said pedal levers respectively in the same direction at the same time so as to change the effective arms of said pedal levers and to thus change the driving ratio effective to propel said vehicle at any particular time.

3. The vehicle defined in claim 2 further characterized in that said means for moving the point of connection between each of said pull and push rods and its associated pedal lever is manually controlled by the operator of said vehicle.

4. A vehicle having a frame, at least one driven wheel for propelling the vehicle and means for driving said wheel, said means comprising a pair of closely associated spaced rotary shafts mounted on said frame and disposed in parallel relation and each having associated therewith a sprocket each of which is connected to its associated shaft by a one way clutch type connector which locks the sprocket to its associated shaft when the sprockets respectively are rotated in the same direction, said sprockets being disposed in substantially the same plane normal to the axis of said pair of spaced shafts, a pulley like element mounted on said frame relatively remote from said pair of sprockets and in substantially the plane of said pair of sprockets, an endless sprocket chain disposed over said pulley like element and over one of said sprockets in such manner that said one sprocket is in driving engagement with the inside of said chain, said chain further having a tangential driving association with said other of said sprockets by engagement between said other sprocket and the outside of said chain whereby any movement of said chain at any moment serves to rotate said sprockets respectively in opposite directions, said chain having relatively long, straight, runs which extend between said pulley like element and said sprockets, a pair of pedal levers, and pull and push rods connected between each pedal lever and one of the runs of said chain respectively said runs being disposed substantially parallel to the propelling motion of the foot engaging parts of said pedal levers and another sprocket chain and associated sprockets connecting said two shafts respectively and said driven wheel.

* * * * *